Nov. 15, 1955  T. O. SUMMERS, JR  2,723,813
AIRCRAFT ALTITUDE CONTROL INSTRUMENT
Filed June 28, 1950  3 Sheets-Sheet 2

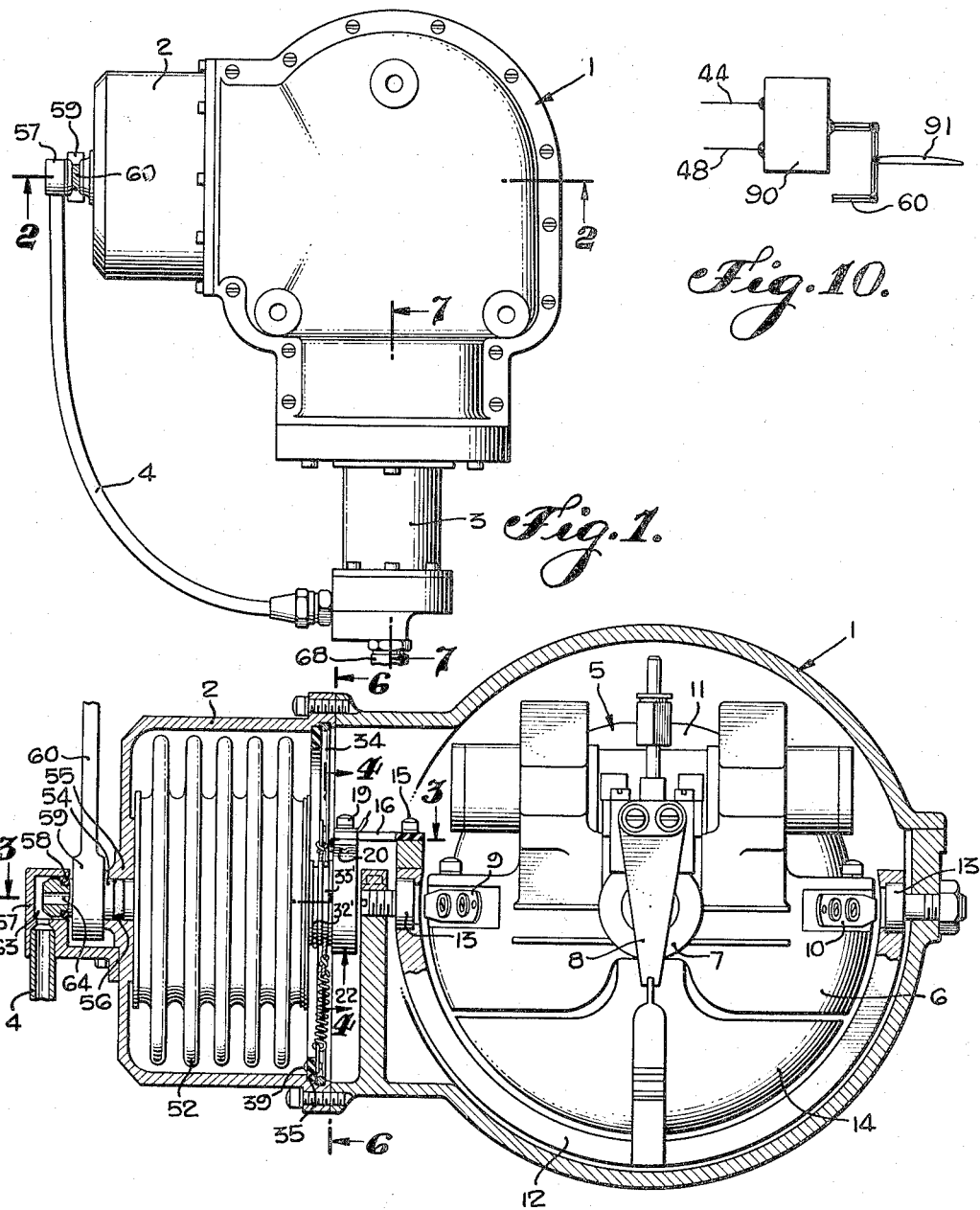

THOMAS O. SUMMERS, JR.
INVENTOR.

BY R E Geangue

ATTORNEY

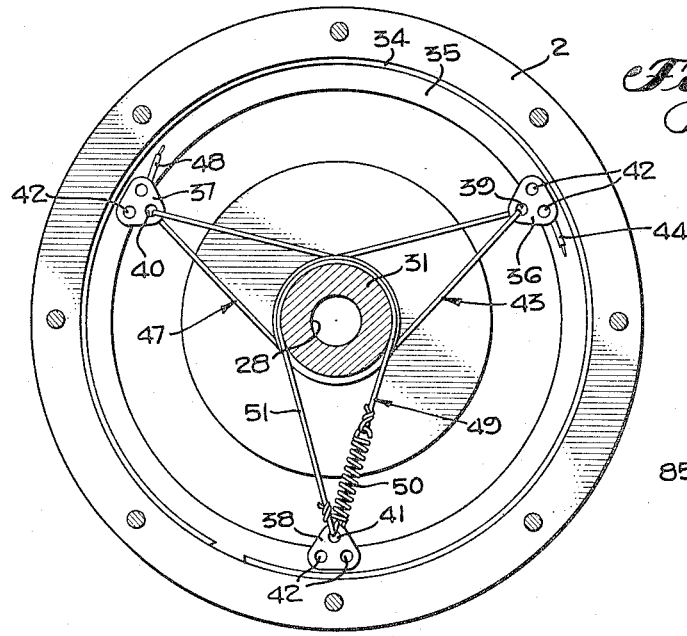
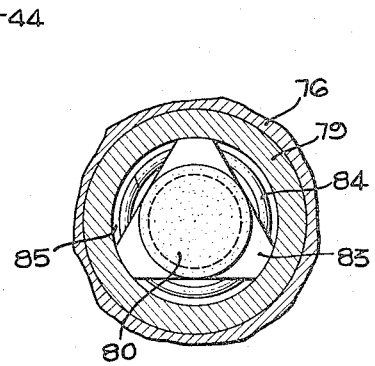
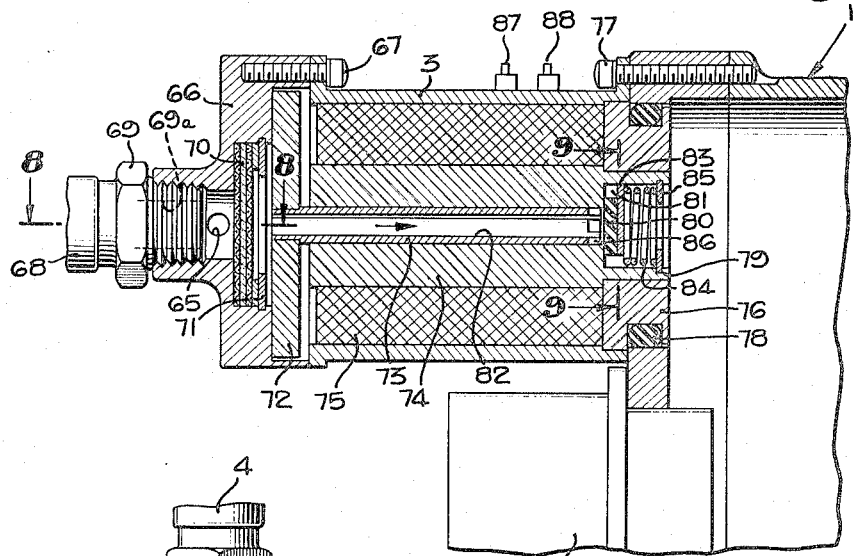
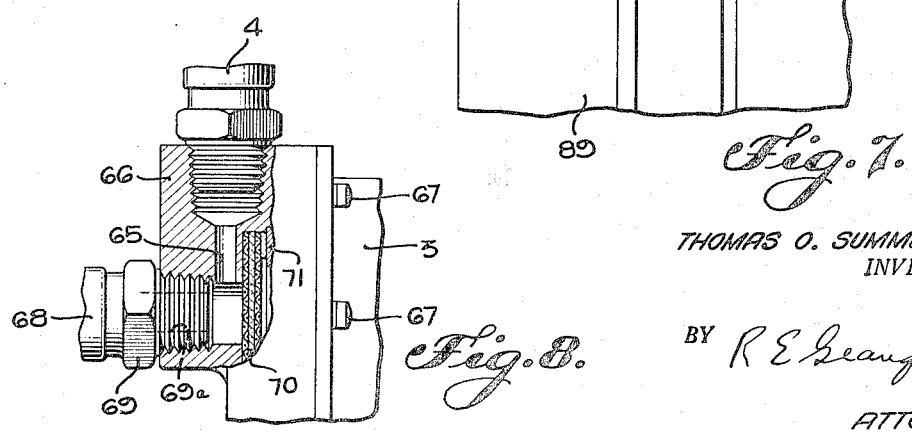
Thomas O. Summers, Jr.
INVENTOR.

United States Patent Office 2,723,813
Patented Nov. 15, 1955

2,723,813

AIRCRAFT ALTITUDE CONTROL INSTRUMENT

Thomas O. Summers, Jr., Sherman Oaks, Calif.

Application June 28, 1950, Serial No. 170,719

11 Claims. (Cl. 244—77)

This invention relates to a novel instrument for maintaining vehicles, such as aircraft and underwater craft, at a desired elevation, and more particularly, it relates to a simple and compact means for sensing both altitude and pitch changes of an aircraft.

This instrument utilizes a pickoff assembly comprised of relatively movable members with one of the members stabilized by a gyro vertical to furnish a pitch reference. A pressure sensitive element is directly fixed to either member of the pickoff assembly so that the member can be biased by the pressure sensitive element without the use of intervening gears and/or linkages. Further, the movement of the member attached to the presure sensitive element is in the same direction as the movement of the pressure sensitive element, which movement provides a simple means for directly biasing the pickoff assembly. Because the pickoff assembly and the pressure sensitive element have a common axis, the instrument can be made smaller than prior instruments, wherein the pressure sensitive element is offset from the pickoff axis and is connected by linkages and/or gearing to the pickoff.

In an altitude control for aircraft, it is the practice to utilize a gyro vertical as the basic pitch reference and to bias this reference with a pressure sensitive device, such as a bellows element. Heretofore, the bellows element has been linked to the pickoff through the expedient of differential gearing or similar apparatus to bias the pickoff in response to altitude changes. By the present invention, it is proposed to eliminate such gearing and linkages by connecting the bellows directly to the pickoff, the null portion of which is spiraled so that expansion and contraction movements of the aneroid actually bias the pickoff angularly without actually physically rotating it.

The pickoff assembly associated with the gyro vertical is modified by the pressure sensitive element to correct for changes in altitude of the aircraft, and is further utilized to sense changes in pitch of the aircraft when altitude control through the use of the pressure sensitive element is not desired.

The pressure sensitive element and the gyro vertical are enclosed in a common case, which is airtight, and which can be connected to the atmosphere through valving means to trap a pressure corresponding to the altitude of the aircraft. By providing this pressure reference for the pressure sensitive element, the aircraft can be maintained at the desired altitude of flight, and because of the large air space within the airtight housing, the sensitivity of the pressure sensitive element is increased.

An object of this invention is to provide a novel altitude control device wherein the pressure sensitive element will quickly and accurately compensate for changes in altitude of the aircraft, and the pressure sensitive element can be directly included within the elevator follow-up linkage so that this linkage can be directly adjusted for changes in altitude.

Another object of the present invention is to provide a novel pickoff, having its null portion spiraled about the axis of the pickoff so that movements of the bellows in the direction of the pickoff axis bias the pickoff null.

Another object of the invention is to provide an altitude responsive means for indicating altitude which requires no relative moving parts, and which has low inertia.

Another object of the invention is the use of an inexpensive bellows element which is directly connected to atmosphere and which accurately adjusts the elevator follow-up in accordance with changes in altitude.

A further object is to provide novel means for retaining the atmospheric pressure existing at the desired altitude of flight to provide a reference pressure against which the bellows can operate.

Still another object of the invention is to increase the sensitivity of the aneroid element by connecting the bellows housing to the gyro housing to enlarge the volume of the air against which the bellows must operate in response to changes in pressure altitude.

These, and other objects of the invention, not specifically enumerated above, will become obvious from the following description and drawings in which:

Fig. 1 is a plan view of the casing of the altitude control device, showing the atmospheric pressure line.

Fig. 2 is a cross-sectional view taken along line 2—2 of Fig. 1, illustrating the gyro vertical and pressure sensitive element in elevation.

Fig. 6 is an elevational view along line 6—6 of Fig. 2, illustrating the suspension for one end of the pressure sensitive element.

Fig. 7 is a cross-sectional view in elevation along line 7—7 of Fig. 1, showing the electrical valve mechanism for confining the reference atmospheric pressure within the device.

Figure 8 is a plan view in cross section along line 8—8 of Fig. 7, illustrating the atmospheric pressure supply line.

Fig. 9 is a view along line 9—9 of Fig. 7, illustrating the valve plate for confining the reference atmospheric pressure within the instrument.

Fig. 10 is a diagrammatic view of the pitch servo for actuating the elevator control surface.

Figure 3:
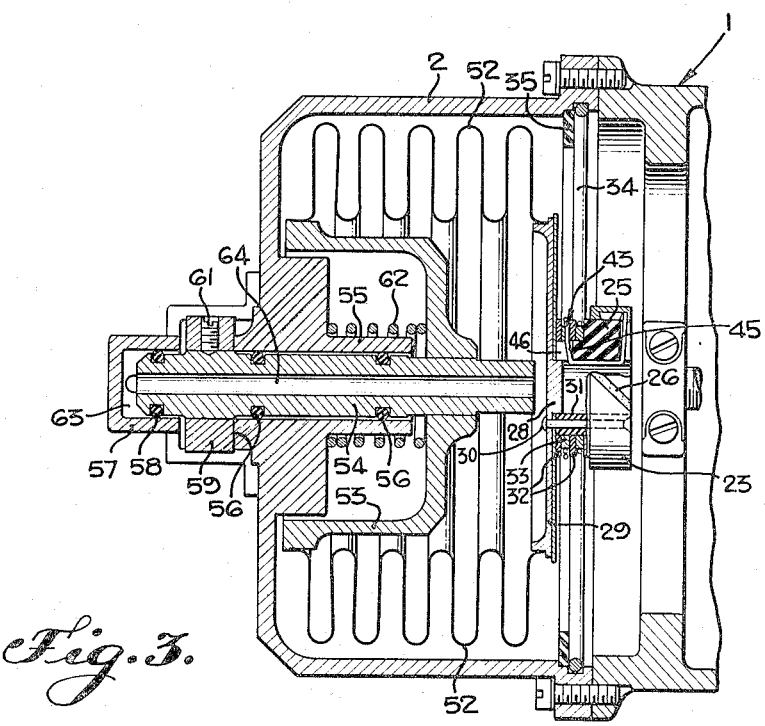
Fig. 3 is a cross-section view taken along line 3—3 of Fig. 2, showing the bellows and a part of the pickoff assembly.
Figure 4:
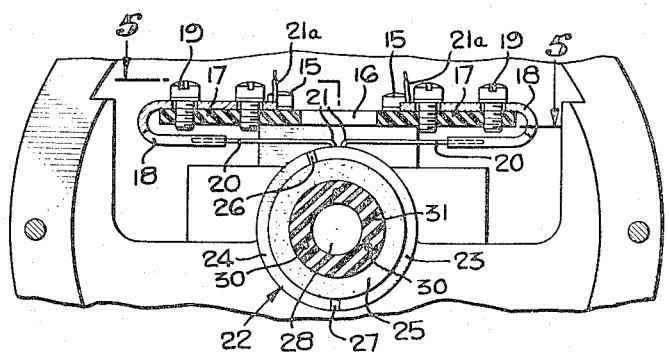
Fig. 4 is a sectional view along line 4—4 of Fig. 2, illustrating the elements of the pickoff assembly.

The instrument of the invention is comprised of a casing 1, which has an extension 2 for housing the pressure sensitive element and an extension 3 for housing the valve control mechanism. The casing is securely mounted in the aircraft which it is to control. A tube 4 connects extension 2 with extension 3 and serves to supply atmospheric pressure to the pressure sensitive element. A gyro vertical is indicated generally at 5, and is of the type fully disclosed in U. S. Patent No. 2,423,270, issued to T. O. Summers, Jr. The outer gimbal 6 is pivotally mounted in casing 1 by means of bearings 7 and contact plate 8 serves to supply electrical power to a rotating lead 9, attached to the outer gimbal. The lead 9 is in the circuit which connects with the gyro motor through the inner gimbal ring (not shown). The return lead for the gyro motor is shown at 10 while the gyro dome, which is attached to the gyro rotor, is shown at 11. The pendulum or bail 12 is rotatively mounted on bearings 13 secured to casing 1. Displaced 90 degrees from bail 12 is a second pendulum or bail 14, which is rotatively mounted on the inside of the inner gimbal ring (not shown) directly behind bearings 7. The bails 12 and 14 normally hang vertically downwards from their respective pivotal supports, and are designed to co-act with the gyro rotor so as to precess the gyro back to true vertical after displacement of the gyro takes place. The gyro 5 is so positioned within the aircraft that it is sensitive to the pitch of the aircraft around its minor gimbal axis, and since bails 12 and 14 remain in the same vertical position as the gyro, movements of the casing 1 and of the aircraft relative to bail 12 will provide a means of controlling the pitch of the aircraft. The manner in which bails 12 and 14 maintain gyro 5 in vertical position is discussed in detail in U S. Patent No. 2,423,270, and only sufficient structure is shown herein to illustrate the manner in which the gyro vertical is utilized as a component of the altitude control instrument.

Attached to one end of bail 12 by means of screws 15 is a non-conducting, U-shaped plate 16, having extension 17 projecting from the side of each leg of the plate. Metal plate conductors 18 curve around the extensions 17, and are secured at one end to extensions 17 by means of screws 19. The slots in plate conductors 18 for receiving screws 19 are larger than the diameter of the screws, so that the position of the conductors 18 with respect to each other can be adjusted. The free end of each plate conductor 18 supports the open ends of a V-shaped wire 20. The wires 20 are positioned in a common plane with the point 21 of each V-shaped wire turned slightly downward to provide an electrical pickoff. The points 21 are spaced apart a sufficient distance to obtain the proper pickoff width, and this distance can be adjusted by adjusting the position of plate conductors 18. An electrical lead 21a is carried by plate 16 and is connected to a source of negative potential through bearing 13 by means of a highly conducting pin (not shown). Branches of lead 21a are attached to both plate conductors 18 so that either or both of the wires 20 can conduct electricity to lead 21a.

The contact points 21 cooperate with the cylindrical contact plate, indicated generally at 22 and composed of cylindrical sections 23 and 24. These sections are mounted on an insulating member 25, and are separated from one another by slits 26 and 27, formed as projections on member 25. The null portion or slit 26 is angularly positioned with respect to the cylindrical plate sections, for reasons later to be explained. The member 25 has an axial opening for receiving a shaft 28, which is made integral with the disk 29. Rivets 30 serve to rigidly attach member 25 to disk 29, so that cylindrical contact plate 22 will move with disk 29.

The extension 31 of member 25 carries four insulating rings; the two rings 32 being of greater diameter than the two rings 33, in order to form two circular grooves 32' and 33' on the surface of the extension 31. Secured within casing extension 2 by means of a snap ring 34 is the insulating ring 35 which mounts plates 36, 37 and 38 having openings 39, 40 and 41 respectively. These plates are attached to ring 35 by rivets 42. A conducting wire loop 43 passes through opening 39 and around groove 33' on extension 31. A positive potential is applied to loop 43 through lead 44 which is connected to plate 36. Attached to loop 43 is lead 45 which passes through opening 46 in extension 31 and connects with cylindrical section 24 in order to apply a positive potential to the section. A similar conducting wire loop 47 passes through opening 40 and around groove 33' on extension 31. A positive potential is applied to loop 47 through lead 48, which is connected to plate 37. The loop 47 is connected with cylindrical plate section 23 by means of a lead (not shown) which passes through an opening in extension 31 similar to opening 46. The loops 43 and 47 are insulated from each other so that they comprise parts of separate circuits. The leads 44 and 48 connect with a servo 90 which acts to move the elevators of the aircraft in the proper direction to control the altitude of flight.

A third loop indicated at 49 is composed of a spring 50 which is hooked into opening 41 and attached to one end of wire 51. This wire passes around groove 32' and ties to opening 41. Since the plates 36, 37 and 38 are positioned 120 degrees apart, the loops 43, 47 and 49 serve to center member 25 and cylindrical contact plate 22 within the casing extension 2. The loops 43 and 47 are non-elastic supporting members, while loop 49 acts, along with gravity, to exert a downward centering force.

The plate 29 is soldered into one of the open ends of a bellows 52, which comprises the pressure sensitive element of the invention. A cup 53 is contained in the other open end of bellows 52 and is rigidly attached to a hollow shaft 54. The casing extension 2 has a hollow projection 55 which rotatively mounts shaft 54 by means of pressure sealing rings 56.

A partial casing 57 is attached to casing 2 and rotatively mounts, by means of pressure ring 58, the end of shaft 54 which projects through the casing 2. The partial casing 57 has an opening for receiving the hub 59 of follow-up lever 60. The hub 59 is secured to shaft 54 by screw 61 so that the shaft 54 can be rotated by the follow-up lever 60 which is directly connected to the elevator surface 91 of the aircraft. A coil spring 62 surrounds the projection 55 and bears against cup 53 so that hub 59 will be continually forced against one end of extension 55. The pressure rings 56 serve to seal the space surrounding the bellows against atmospheric pressure while the pressure ring 58 seals the chamber 63 in partial casing 57 against the atmosphere. The axial opening 64 in shaft 54 connects the inside of bellows 52 with chamber 63.

The pressure line 4 connects chamber 63 with a passage 65 in partial casing 66 which is secured to casing extension 3 by means of screws 67. The atmospheric pressure line 68 connects to the static pressure line of the Pitot tube carried by the aircraft, and also with the nipple 69 which is screw threaded into partial casing 66. The nipple 69 has an opening 69a connecting with passage 65 which is open at its end. The pressure line 4 therefore serves to connect the inside of bellows 52 to atmospheric pressure through chamber 63 and opening 64.

Positioned in partial casing 66, directly over the opening in the end of nipple 69, is a filter 70 which is secured in place by ring 71. Also positioned within casing 66 is an armature disk 72 which is attached to one end of a hollow tube 73. The tube 73 is slideably mounted in an axial opening in core 74 and the core 74 is surrounded by solenoid winding 75. A circular ring 76 is positioned between and held in place by casing 1 and casing extension 3, which are fastened together by screws 77. An annular groove around ring 76 contains a pressure seal 78 which prevents dust from entering casing 1. The core 74 has an extension 79 which is secured within the opening in ring 76. A circular disk valve 80 is positioned within chamber 81 of extension 79 to control the pressure communication between chamber 81 and the opening 82 in tube 73. The valve 80 is mounted upon a triangular plate 83 which is slidably mounted within extension 79. A coil spring 84 is retained within extension 79 and is positioned between snap ring 85 and plate 83. The end of tube 73 contains a series of slots 86 through which opening 82 communicates with chamber 81 when armature disk 72 is moved toward solenoid coil 75. The chamber 81 is at all times in communication with the inside of casing 1.

It is therefore apparent that as long as solenoid coil 75 is not energized, the spring 84 will force the armature disk 72 against partial casing 66 and will move slots 86 of tube into core 74. Also the disk valve 80 will be forced against the end of core 74 and close the end of tube 73. Under this condition, the opening in the end of nipple 69 cannot communicate with the inside of casing 1. However, when solenoid coil 75 is energized through leads 87 and 88, the armature disk 72 is moved toward the coil 75, and the slots 86 in tube 73 are moved into chamber 81 against the pressure of spring 84. The pressure in nipple 69 can now communicate with the inside of casing 1 through filter 70, opening 82, slots 86 and around plate 33.

A connector 89 is secured to casing 1 and has connections (not shown) for leads 21a, 44, 48, 87 and 88. The connector is supplied with 24 volt D. C. from the electrical power supply for the aircraft in which it is mounted.

Figure 5:
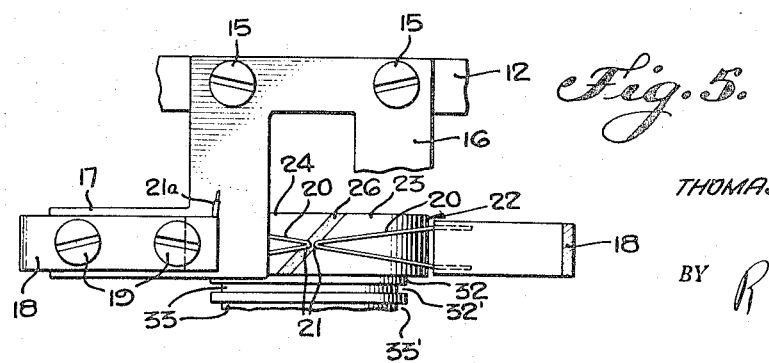
Fig. 5 is a plan view of the pickoff assembly taken along line 5—5 of Fig. 4.

The operation of the altitude control instrument will now be explained. When it is desired to control only the pitch of the aircraft, solenoid 75 will be energized to maintain the inside of casing 1 and the space surrounding bellows 52 at atmospheric pressure. Also, the inside of bellows 52 will be at atmospheric pressure, since it is always directly connected to the atmosphere by pressure tube 4. The bellows will therefore assume its normally un-stressed position. Since the bellows is directly connected to cylindrical contact plate 22, it will position the middle of slit 26 directly under contact points 21, as shown in Fig. 5, when the aircraft is in level flight. However, should the aircraft nose downwardly, the cylindrical plate 22 will move along with the aircraft, relative to contact points 21 which are attached to bail 12 and therefore stationary in space. The contact points will then contact cylindrical section 23, causing electrical current to flow through lead 48, loop 47, and lead 21a, and thereby, the elevator servo will be energized to move the elevator surface upwardly to correct for the downward pitch. The follow-up lever 60 moves with the elevator surface, and this surface will continue to move upwardly until the slit 26 is again positioned under contact points 21 by lever 60. Since the bellows 52 is directly connected to the lever 60 and to cylindrical contact plate 22, it will transmit the movement of the lever to the plate 22. The lever 60 will develop a torsional force on bellows 52 and since the bellows is very rigid in torsion, it will faithfully transmit movements of lever 60 to cylindrical contact plate 22.

Once the slit 26 has been positioned under contact points 21, the elevators will cease to move momentarily and the aircraft will begin to level off, since the elevators have been moved in the upward direction. As the aircraft levels off, it will move with respect to contact points 21 and move cylindrical section 24 into contact with points 21. This will cause the circuit consisting of lead 44, loop 43 and lead 21a to be energized, and result in the elevator being moved downwardly by the servo. The lever 60 will again move slit 26 into position under contact points 21 as the elevator moves toward streamline position. Further leveling off of the aircraft will again cause cylindrical section 24 to move under contact points 21 and thereby reduce to elevation of the elevators, and this downward movement of the elevators will continue until slit 26 is again positioned under contact points 21. When the aircraft has finely leveled off, there will be no rise or fall of the aircraft, and slit 26 will remain in position under the contact points 21. The type of follow-up which has been explained can be utilized to control the aircraft in pitch, since the aircraft has sufficient drag during pitching movement to prevent the aircraft from over-shooting its level position, once it has been reached.

The ends of the bellows 52 and the cylindrical contact plate 22 are maintained in proper position during the turning of the bellows, since they are suspended on loops 43, 47 and 49 which permit rotation of member 25 within the insulated rings 32 and 33.

When the nose of the aircraft rises, the cylindrical section 24 will first come in contact with points 21 and the elevator will move downwardly until slit 26 is again brought under the contact points 21 by follow-up lever 60. As the aircraft proceeds to level off, cylindrical section 23 will come into contact with points 21 until the aircraft has leveled off and the elevators have been streamlined.

When it is desired to control the altitude of the aircraft, the aircraft is brought to the desired altitude and the solenoid coil 75 is then de-energized. This allows spring 85 to move slots 86 into core 74 and to move valve 80 against core 74 to cut off the pressure communication of chamber 81 with the atmospheric pressure line 68. It is therefore apparent that the pressure trapped within airtight casing 1 will correspond to the atmospheric pressure at the desired altitude. This trapped pressure will act against the outside of bellows 52, while the inside of the bellows is constantly connected to atmosphere by tube 4. When the altitude of the aircraft increases above the desired altitude, the pressure within the bellows will drop and the bellows will be compressed, while if the altitude of the aircraft decreases, the bellows will expand due to the higher pressure within the bellows.

Any movement of the bellows will result in longitudinal movement of the whole cylindrical contact plate 22, which is directly attached to the bellows. The manner in which the end of the bellows is suspended on loops 43, 47 and 49 allows for this movement. In order that this movement of contact plate 22 can be made to correct for changes in altitude, the null portion or slit 26 has been angularly positioned with respect to cylindrical sections 23 and 24. By so positioning the slit 26, a simple means is provided for altitude control whereby the bellows can be placed in the follow-up linkage to easily adjust the linkage so that changes in altitude can be compensated for. Prior to the time when altitude control is desired, the pressure on both the inside and outside of the bellows is the same, and the contact points 21 are positioned approximately at the mid-section line of cylindrical contact plate 22. When the solenoid 75 is de-energized for altitude control, any decrease in atmospheric pressure within bellows 52 will move contact plate 22 longitudinally of contact points 21, so that cylindrical section 24 will come under the contact points 21. This decrease in pressure within the bellows could result when the aircraft is caught in an updraft. As a result of the increased altitude and decreased pressure in bellows 52, the lead 44 connected to cylindrical section 24 will be energized and cause the servo to move the elevators in a downward direction to correct for the gain in altitude. The follow-up lever 60 will function in its usual manner to move slit 26 back under contact points 21 after the cylindrical contact plate 22 has been moved by the bellows. As the pressure builds up in the bellows, the cylindrical contact plate 22 will be moved back toward its initial position, which movement will cause cylindrical section 23 to come in contact with points 21. The lead 48 connected to cylindrical section 23 will then be energized and cause the elevators to raise somewhat, and at the same time follow-up lever 60 will be moving slit 26 back into contact with points 21. The position of slit 26 relative to contact points 21 will be continually changing until the aircraft is brought back to the desired altitude, where the pressure on the inside and outside of the bellows is equalized. The circuit through cylindrical section 23 will continually cause the elevator surface to rise, so that it will be streamlined when the desired altitude is attained.

When the aircraft is caught in a downdraft and there is a decrease in altitude, the bellows 52 will expand and move cylindrical section 23 into contact with points 21. The lead 48 will be energized and cause the servo to raise the elevators so as to increase the altitude. The follow-up lever 60 will again function to move slit 26 back under contact points 21 after the cylindrical contact plate 22 has been moved to the new position. As the pressure decreases in the bellows, the bellows will be compressed and cylindrical contact plate 22 will be moved back toward its initial position. This movement will cause cylindrical section 24 to come in contact with points 21, and lead 44 will then be energized to lower the elevators somewhat. Each time that cylindrical section 24 causes the elevators to lower, the follow-up lever 60 will move so as to bring slit 26 back into contact with points 21. It will not be possible for the follow-up to level off the airplane until the proper altitude has been reached, and longitudinal movement of cylindrical contact plate 22 with respect to contact points 21 has ceased.

The sensitivity of the aneroid element depends upon the principle that when the pressure within the bellows varies from the pressure enveloping the bellows, an expansion or contraction of the bellows results until an equilibrium is reached. Movement of the bellows 52 can not change the pressure on the interior thereof for the reason that the inside of the bellows is connected through passage 4 to the atmosphere, which is infinite in volume. However, movement of the aneroid element do effect the volume of its airtight exterior chamber, as a consequence of which, pressure within the chamber is affected in accordance with the gas laws. Thus, if the airtight housing is of a small volume, the sensitivity of the aneroid will be correspondingly reduced. It is for this reason that the airtight casing for the gyroscope 5 and the housing for the bellows 52 have been joined to form a common airtight case of expanded volume.

From the description, it is apparent that the altitude control instrument is capable of correcting for both pitch of the aircraft and changes in altitude. When the change in altitude is due to pitch of the aircraft, the cylindrical contact plate 22 is rotated along with the aircraft, relative to contact points 21. Also, cylindrical contact plate 22 is moved longitudinally of contact points 21 because of the change in pressure within the bellows due to the changes in altitude. Because of the angular position of slit 26, the longitudinal movement of cylindrical contact plate 22 becomes equivalent to additional rotational movement of contact plate 22. The servo for the elevator will respond to displacement of slit 26 from contact points 21, regardless of whether this displacement results from change in pitch or change in altitude of the aircraft. The follow-up 60 will function to continually move slit 26 toward contact points 21 until the aircraft has been leveled off at the proper altitude. When it is no longer desired to control the altitude of the aircraft, the solenoid coil 75 can be energized to allow the inside of casing 1 to again communicate with the atmosphere.

A novel altitude control instrument has been described, having a minimum of moving parts, which feature enables the instrument to be highly sensitive to changes in atmospheric pressure. A single pickoff assembly is utilized to control both the pitch and the altitude of the aircraft with which the instrument is used. By including the pressure sensitive element directly within the follow-up system, the system can be directly adjusted by the pressure sensitive element, so that changes in altitude of the aircraft can be corrected for by the instrument. Various modifications are contemplated and may obviously be resorted to by those skilled in the art, without departing from the spirit and scope of the invention, as hereinafter defined by the appended claims.

What is claimed is:

1. An altitude control for an aircraft comprising a gyroscope having at least one of its gimbal axes parallel to the transverse pitch axis of the aircraft, a gravity sensitive erecting device to erect said gyroscope to the vertical about said transverse axis to provide a vertical reference, a pickoff to sense angular movements of said aircraft about said transverse axis, an aneroid element associated with said pickoff and adapted to move said pickoff transversely of said vertical reference upon contraction and expansion of said aneroid, said transverse movement resulting in biasing of the pickoff null, an airtight casing enclosing said aneroid element, said gyroscope, said erecting means, and said pickoff, means connecting the interior of said aneroid element to the atmosphere, and an electrically operated valve for connecting the interior of said airtight casing to the atmosphere.

2. In an instrument for controlling the pitch and altitude of an aircraft, pick-off means for adjusting the pitch of said aircraft comprising a member fixed in space and a movable member, altitude sensitive means mounted for rotation with respect to said fixed member upon changes in pitch and for bodily movement with respect to said fixed member upon changes in altitude, means for directly mounting said movable member on said altitude sensitive means for movement therewith, and servo means continually controlled by said pick-off means to maintain said aircraft in level flight at constant altitude.

3. In an instrument for obtaining pitch and altitude control signals for an aircraft, first means fixed in space, second means rotated by said aircraft during changes in pitch, said first and second means cooperating as a pick-off means during rotation of said second means to provide a level flight control signal, pressure sensitive means for bodily moving said second means relative to said first means upon change in altitude, said first and second means also cooperating as a pick-off means during bodily movement of said second means to provide an altitude control signal.

4. In a device for controlling the pitch and altitude of an aircraft, a control surface, first means fixed in space, a pitch servo unit having a follow-up system connected to said control surface and including an element responsive to changes in altitude, second means connected to said element and rotatable therewith relative to said first means upon a change in pitch of the aircraft, said second means being moved bodily by said element transversely to said first means upon changes in altitude, said first and second means comprising pick-off means to actuate said servo unit upon a change in pitch or altitude of said aircraft so as to maintain said aircraft in level flight at constant altitude.

5. In an instrument for controlling the pitch and altitude of an aircraft, a first means fixed in space, a second means rotatable with said aircraft relative to said first member during changes in pitch of said aircraft, a pressure sensitive element for bodily moving said second means transversely to said first means upon a change in altitude of said aircraft, said first and second means comprising a pick-off means a null pick-off portion carried by said second means and angularly positioned with respect to the direction of said bodily movement, said null portion being normally in contact with said first means during level flight at constant altitude and being moved out of contact with said first means upon a change in pitch and/or altitude.

6. In an instrument for controlling the pitch and altitude of an aircraft, a first member fixed in space and a second member having an elongated pick-off null portion normally opposite said first member during level flight at the reference altitude, said first and second members comprising a pick-off means connected to a control means, means for rotating said second member relative to said first member during pitching motion and for bodily moving said second member relative to said first member during changes in altitude in order to move said null portion away from said first member and thereby actuate said control means.

7. A pitch and altitude control system for an aircraft comprising a pick-off means having a first member fixed in space and a second member having a pick-off null portion positioned opposite said first member during level flight at the reference altitude, a control surface, a pitch control means actuated by movement of said null portion away from said first member, a follow-up connected to said control surface and movable by said pitch control means, a bellows connecting said follow-up with said second member to rotate said second member with respect to said first member upon movement of said follow-up relative to said first member during departure of the aircraft from level flight, said bellows being responsive to changes in atmospheric pressure to bodily move said second member with respect to said first member, said null portion being positioned at an angle to the direction of said bodily movement so that said bellows will move said null portion away from said first member upon a change in altitude or pitch.

8. In an instrument for controlling the pitch and altitude of an aircraft, a first member fixed in space, an electrical pickoff carried by said first member, a second member having an electrical null strip positioned between two conducting portions and normally opposite said pickoff during level flight at reference altitude, a pressure sensitive element for bodily moving said second member and said null strip transversely of said pickoff during changes in altitude of said aircraft, said null strips being angularly positioned to the direction of said bodily movement so that said null strip will be moved away from said pickoff upon changes in altitude and means for rotating said second member and said null strip relative to said pickoff upon changes in pitch of said aircraft to move said null strip away from said pickoff.

9. A pitch and altitude control system for an aircraft comprising a pitch control means, a first member fixed in space, a second member cooperating with said first member to actuate said pitch control means of said aircraft, a control surface, a follow-up connected to said control surface and rotatable by the pitch control means, a bellows connected between said follow-up and said second member to rotate said second member with respect to said first member upon rotation of said follow-up with respect to said first member, said bellows being responsive to changes in atmospheric pressure to bodily move said second member with respect to said first member, and a plurality of wire loops supporting said bellows and said second member from the aircraft for rotational and bodily movement.

10. A pitch and altitude control system for an aircraft comprising a first means fixed in space, second means rotatable by said aircraft with respect to said first means during a change in pitch, pitch control means responsive to the position of said second means relative to said first means to adjust the pitch of said aircraft, follow-up means for rotating said second means to cause said pitch control means to level off the aircraft after a change in pitch, said follow-up means containing a pressure sensitive element positioned between interior and exterior chambers normally connected to atmosphere, third means for selectively trapping within said exterior chamber a pressure corresponding to atmospheric pressure at the desired altitude of flight to cause said element to become sensitive to changes in altitude, said second means being connected to said pressure sensitive element and bodily moved thereby relative to said first means upon changes in atmospheric pressure in order to cause said pitch control means to maintain the aircraft at the desired altitude.

11. In an instrument for controlling the pitch and altitude of an aircraft, a pick-off means having a first member fixed in space and a second member movable with respect to said first member, means for providing relative rotation between said first and second members during changes in pitch of said aircraft, means for providing relative bodily movement between said first and second members upon changes in altitude of said aircraft, and pitch servo means controlled by said pick-off means, said relative movements between said first and second members causing said servo means to maintain said aircraft in level flight at constant altitude.

References Cited in the file of this patent

UNITED STATES PATENTS

| | | |
|---|---|---|
| 452,877 | Knofler | May 26, 1891 |
| 2,091,300 | Bassett | Aug. 31, 1937 |
| 2,091,306 | Carlson | Aug. 31, 1937 |
| 2,358,803 | Hanson et al. | Sept. 26, 1944 |
| 2,437,371 | Allen | Mar. 9, 1948 |
| 2,512,902 | Rossire | June 27, 1950 |